April 17, 1934. L. A. CHAPLEAU ET AL 1,955,408
FISHING LURE
Filed May 19, 1933
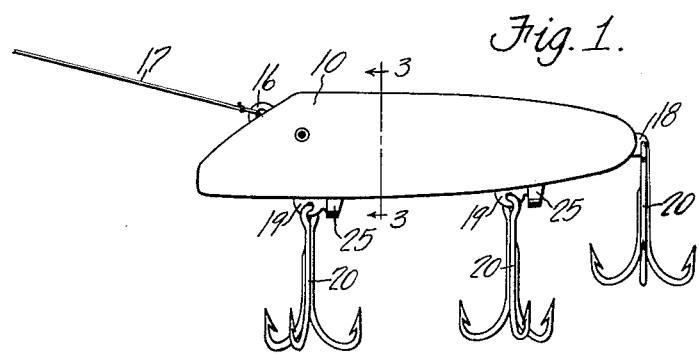
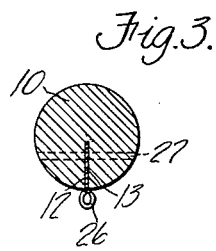
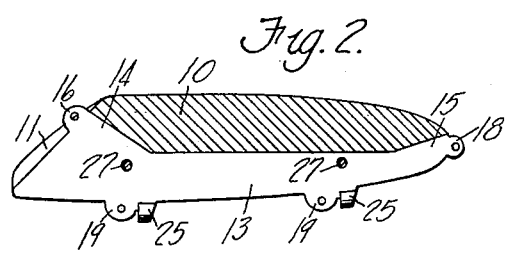
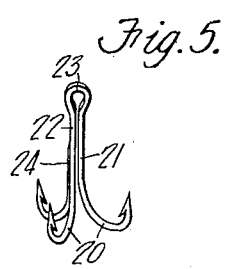
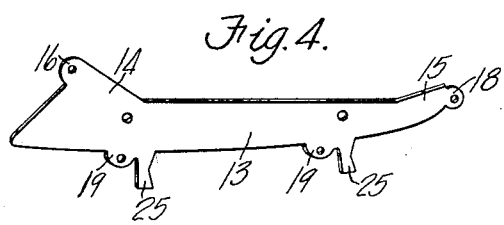
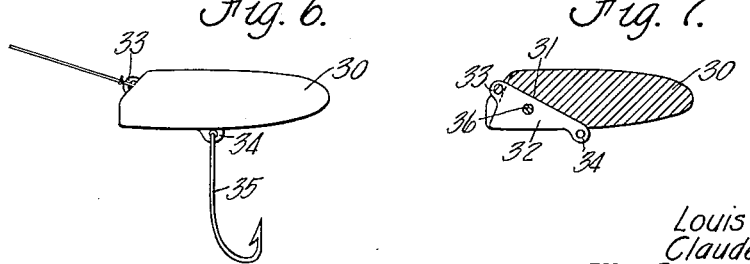
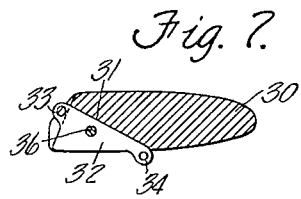
INVENTORS.
Louis A. Chapleau.
Claude M. Rodgers.
BY
ATTORNEY.

Patented Apr. 17, 1934

1,955,408

UNITED STATES PATENT OFFICE 1,955,408

FISHING LURE

Louis A. Chapleau, South Bend, and Claude M. Rodgers, Clay Township, St. Joseph County, Ind., assignors to South Bend Bait Company, South Bend, Ind.

Application May 19, 1933, Serial No. 671,888

7 Claims. (Cl. 43—46)

The invention relates to fishing lures and particularly to plug type lures mounting detachable hooks.

In the manufacture of plug type lures it has heretofore been conventional practice to apply line attaching and hook mounting means in the form of eyelet screws to the lure body. This necessitated the handling of a large number of parts in the assembly of the lure; involved frequent splitting of the lure body in applying the screws; required removal of the eyelet screw to permit replacement of broken hooks with the incident looseness of the mounting of the new hooks resulting from replacing a mounting screw in the same hole in the lure body in which the old screw had been mounted; required the stress incident to "playing" a fish to be borne by the lure body and the threaded engagement of the line and hook attaching means with the lure body; and often resulted in unbalanced lures whose action, desired to be governed by the provision of the lure with deflecting faces and the like, was interfered with, exaggerated or dampened by the lack of balance of the lure body.

It is therefore the principal object of the invention to provide a lure which overcomes these objections and defects.

A further object of the invention is to provide a lure of this character with a central longitudinally extending kerf receiving a plate serving as a balance for the lure body and carrying line and hook attaching means whereby the stress incident to "playing" a fish is sustained solely by the plate.

A further object is to provide a lure of this character having a plate provided with hook mounting means and juxtaposed means integrally therewith for limiting the movement of the hooks relative to the lure body.

A further object is to provide a lure of this character with a plate of a width less than one-half the thickness of the lure and whose end portions project laterally thereof to carry line and hook attaching means disposed at or above the longitudinal center of the lure.

A further object is to provide a device of this character which is inexpensive to manufacture and assemble.

With the above and other objects in view, the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a view of the lure in side elevation.

Figure 2 is a longitudinal vertical sectional view of the lure.

Figure 3 is a vertical transverse sectional view of the lure taken on line 3—3 of Figure 1.

Figure 4 is a perspective view of the plate blank.

Figure 5 is a perspective view of a set of hooks.

Figure 6 is a view of a modified construction of lure in side elevation.

Figure 7 is a longitudinal vertical sectional view of the lure illustrated in Figure 6.

Referring to the drawing, and particularly to Figures 1 to 5 thereof, the numeral 10 designates a lure body of the plug type having a diving or deflecting face 11 formed at its forward end. In the lower side of the body 10 is formed a longitudinally extending radial slot or kerf 12 of a depth less than one-half the thickness of the body for the major portion of the length thereof to minimize slitting or breaking of the lure body. The kerf 12 is provided with angularly upwardly directed end portions, for purposes to be hereinafter set forth.

A plate 13 of a thickness equal to the width of kerf 12 tightly fits into said kerf. The outer edges of said plate lie flush with and conform to the shape of the lure body and cooperate therewith to form a continuous surface for the lure along the kerf. Angularly upwardly directed portions 14 and 15 are formed at the forward and rear ends, respectively, of the plate and fit into the angularly directed kerf portions to insure correct positioning of the plate relative to the body. Integral with portions 14 of the plate 13 is formed an apertured tab 16 which projects from the forward face of the lure body at a point slightly above the longitudinal axis of the lure body and forms means for attachment of a line 17. Integral with portion 15 of plate 13 at the rear thereof is formed an apertured tab 18 which projects from the lure body and substantially coincides with the longitudinal axis of the lure body to form a hook attaching means. One or more apertured tabs 19 are also integrally formed with plate 13 at points intermediate the length thereof at its lower side and project beyond the outline of the lure body to form additional hook attaching means.

Any suitable hooks may be attached to the tabs 18 and 19, such as the triple hooks 20 illustrated in Figure 5. The hooks 20 are of a conventional construction in which the shanks 21 and 22 of two of the hooks are interconnected with a spring loop 23, and the shank 24 of the third hook is secured, as by soldering to one of the shanks 21, 22. It will readily be seen that such a hook is easily mounted on or detached from a hook mounting means, and is retained in mounted position by the action of the spring 23.

Integrally formed with plate 13 in adjacent rearwardly disposed relation to hook mounting tabs 19 are tabs 25. The tabs 25 are of a length greater than tabs 19 and are bent into a loop 26 as illustrated in Figure 3, the loop so formed preferably projecting slightly below tab 19 whereby it serves as a stop to limit the rearward pivoting of hook 20 on tab 19 and prevents said hooks from engaging the lure body as the lure is drawn through the water.

In the assembly of the lure, the tabs 25 of plate 13 are bent to form a loop 26, and the hooks 20 are mounted on the tabs. The plate is then applied to the kerf 12 of the lure body 10 into which it tightly fits in proper relation, and a pair of holes are drilled transversely through the lure body and plate, into which pins 27 are inserted to hold the plate in the body kerf. The pins 27 are then cut flush with the adjacent surface of the lure body. The lure may then be painted, enameled or otherwise finished to decorate the lure and seal the kerf. It will be understood, however, that the hooks 20 need not be applied to their mounting tabs on plate 13 until after the plate has been mounted in the lure body and the lure has been painted, if it is desired to prevent painting of portions of the hooks. It will likewise be understood that any other suitable means, such as cement, may be employed to hold the plate in its kerf.

A modified construction of lure, adapted for use in comparatively small casting sizes, as for trout fishing, as illustrated in Figures 6 and 7. In this construction the lure body 30 is provided with a radial upwardly directed kerf 31 formed at the forward under side thereof and extending angularly upwardly from a point intermediate the length of the lure body to the forward end thereof at a point above the longitudinal axis of the lure body. In this kerf 31 is disposed a plate 32 whose outer edges conform in shape to and are flush with the adjacent outer faces of the bait. An integral apertured tab 33 projects from the forward upper end of plate 32 to form means for the attachment of a line 33; and another apertured plate or tab 34 is formed integrally with plate 32 at the rear of said plate to project below the bottom of the lure and form means for attachment of suitable hook or hooks 35. A transverse pin 36 extending through the lure body and plate is preferably employed to hold said plate to the lure body.

It will thus be seen that in both of these constructions the plates serve to properly balance the lure and overcome the unbalancing effects of heavy sappy spots in the wood, as frequently occur in red cedar, of which most plug type lure bodies are made. Other advantages of these lure constructions are that the lure body is not subjected to the stresses incident to "playing" a fish, and that the hooks may be simply and easily removed from and replaced on the lure. In addition to these advantages, these lure constructions enable woods of light weight and resultant live action, such as white cedar, whose texture is too spongy to effectively retain screws therein as has been required in previous conventional plug type lures, to be used with resultant improved actions of the lures. Still another advantage of these constructions is that the enamel protective coating thereof need never be pierced, as by applying screws thereto which pierce and break the protective coating and thus leave openings through which water may seep therein with resultant rotting action thereon, since the plate is inserted in the body kerf before the same is enameled, and the plate-carried line and hook attaching means project from the lure body and are thus readily accessible without in any way damaging the waterproof seal for the lure body which is formed by the enamel.

The invention having been set forth, what is claimed as new and useful is:

1. In a fishing lure, a plug type body having a diving face inclined to the longitudinal axis of the body and a longitudinal radial kerf extending from the central under side of said body, said kerf being of a depth less than one-half the thickness of said body for the major portion of its length and extending angularly upwardly at its ends, a plate conforming to the shape of and mounted in said kerf, line attaching means carried by the forward end of said plate, and hook attaching means carried by the rear end of said plate, said line and hook attaching means being positioned at or above the longitudinal axis of said lure body.

2. In a fishing lure, a plug type body having a longitudinal kerf formed therein, said kerf being of a depth corresponding substantially to the radial dimension of said body for its major portion and of greater depth at its ends, a plate conforming to the shape of and mounted in said kerf with its outer edges flush with the adjacent surfaces of said lure body, a line attaching tab integral with said plate and projecting outwardly of said body above the longitudinal axis thereof, and a hook mounting tab integral with said plate and projecting outwardly of said body at the rear end thereof adjacent the longitudinal axis of the lure.

3. In a fishing lure, a plug type body, a plate imbedded in said body, a member carried by said plate and projecting from said body, a hook pivoted to said member, and a second member carried by said plate in rearwardly spaced relation to said first member and bent upon itself to form a stop to limit the rearward pivoting of said hook.

4. In a fishing lure, a plug type body having a longitudinal kerf formed therein, a plate mounted in said kerf, an apertured tab formed integrally with said plate and projecting beyond said body, a hook pivotally carried by said tab, and a second tab formed integrally with said plate and projecting beyond said body in adjacent rearwardly disposed relation to said first tab, said second tab being bent upon itself and serving to form a stop limiting the rearward pivoting of said hook.

5. In a fishing lure, a plug type body, a plate imbedded in said body with its outer edge flush with the surface of the lure body, and a member formed integrally with said plate and projecting beyond the outline of said lure body, a hook pivoted to said member, said member including a loop portion rearwardly of said hook for limiting the pivoting of said hook.

6. A fishing lure comprising a single rigid elongated body having a forward and rear end, a kerf extending the full length of the body, and a single continuous rigid plate disposed in said kerf in the body, and extending longitudinally thereof, said plate terminating at one end in line attaching means extending forwardly of the forward end of the body, the rear end of said plate terminating beyond the rear end of the body in hook attaching means.

7. A device as set forth in claim 6 including an upwardly inclined extension at the forward end of the rigid plate and terminating in line attaching means above the longitudinal center of the bait body.

LOUIS A. CHAPLEAU.
CLAUDE M. RODGERS.